(12) United States Patent
Chang

(10) Patent No.: US 6,741,809 B1
(45) Date of Patent: May 25, 2004

(54) IMAGE CAPTURING APPARATUS WITH LASER-FRAMING VIEWFINDER AND LASER POINTER FUNCTIONS

(75) Inventor: Shan-Wen Chang, Chang-Hua Hsien (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 10/605,048

(22) Filed: Sep. 4, 2003

(30) Foreign Application Priority Data

Jul. 14, 2003 (TW) ........................................ 92119172 A

(51) Int. Cl.$^7$ .............................................. G03B 17/48
(52) U.S. Cl. ................... 396/431; 438/333.01; 352/131
(58) Field of Search .......................... 396/431; 348/532, 348/207.99; 352/131, 171

(56) References Cited

U.S. PATENT DOCUMENTS 5,650,817 A * 7/1997 Jae-chon .................. 348/240.3
6,163,657 A * 12/2000 Emery ........................ 396/431
6,340,114 B1 * 1/2002 Correa et al. .......... 235/462.22

* cited by examiner

Primary Examiner—David M. Gray
(74) Attorney, Agent, or Firm—Winston Hsu

(57) ABSTRACT

A laser source is installed inside a housing for generating a laser beam. A first lens group is installed inside the housing for diverging the laser beam from the laser source. A reflecting object is installed inside the housing in a rotatable manner for reflecting the laser beam from the first lens group. A second lens group is installed inside the housing for diverging the laser beam from the reflecting object. A framing mask masks the laser beam and displays a laser-framing viewfinder. A third lens group is installed on the housing for focusing the laser beam. A camera lens is installed on the housing for capturing an image framed in the laser-framing viewfinder. When the reflecting object rotates to a first location a laser-framing viewfinder is generated. When the reflecting object rotates to a second location a laser pointer is generated.

9 Claims, 12 Drawing Sheets

IMAGE CAPTURING APPARATUS WITH LASER-FRAMING VIEWFINDER AND LASER POINTER FUNCTIONS

BACKGROUND OF INVENTION

1. Field of the Invention

The present invention relates to an image capturing apparatus, and more specifically, to an image capturing apparatus with laser-framing viewfinder and laser pointer functions.

2. Description of the Prior Art

In todays modern information based society, information devices are increasingly following the trends of small size, light-weight, and portability. Examples of such devices include: USB flash drives, recording pens, MP3 players and so on. Manufacturers want to integrate as many functions into a portable device as possible and the digital camera is no exception.

Digital cameras have become popular digital products and are positioned to eventually replace conventional film cameras due to low prices and compatibility with other electronic peripherals. Please refer to FIG. 1. FIG. 1 is a front view diagram illustrating a conventional first digital camera 10. The first digital camera 10 includes a camera lens 12 for capturing an object, an optical viewfinder 14 composed of several lenses for users to view the image of an object refracted by the lenses, and a shutter button 16 for focusing and shooting. Please refer to FIG. 2. FIG. 2 is a rear view diagram of the first digital camera 10. The first digital camera 10 further includes an electrical viewfinder 18 providing users another option to view the image of the object, which can be a liquid crystal display (LCD) or a low temperature polysilicon (LTPS) display. A control button set 20 allows users to browse and edit images or to set up parameters. The first digital camera 10 differs from conventional film cameras by providing the electrical viewfinder 18. Users can view the image of the object on the electrical viewfinder 18 instead of the smaller optical viewfinder 14. In addition, the users can use the electrical viewfinder 18 to browse the images after shooting.

However, the image displayed on the electrical viewfinder 18 is limited by resolution and size and because it is a result of an image signal captured by an image sensor and then processed by a digital signal processor (DSP), distortion when compared to the actual image is observed. Users may discover blurry images due to non-focusing or hand trembling that is not apparent when shooting them. Moreover, the electrical viewfinder 18 has high power consumption and has a limited angle of view.

Alternatively, users can view the object through the optical viewfinder 14. In this situation users are required to hold the camera close to their face, which is not only inconvenient but also slows down shooting. Additionally, the LCD or LTPS used in the electrical viewfinder 18 costs a significant amount and is not profitable on low-level digital cameras or small-size digital image capturing apparatuses. Thus, there is a need to design a lower cost viewfinder for small-size low-cost digital image capturing apparatuses.

Furthermore, digital cameras have become popular digital products and are divided into high-level and low-level product lines. Low-level digital cameras do not have many functions, such as image zoom or other shooting condition settings, so they can be reduced to a size as small as a pen disk. Because the function of low-level digital cameras only supports image capturing, this product design really needs to be improved to follow the modern trend of integrating many office functions into a single information device. Additionally, portable storage devices only provide functions such as data storage, voice recording, and playing MP3 files and do not provide other office functions like image capturing or laser pointing in a meeting. Thus, there is a need to design an apparatus integrating the many functions mentioned above into a single portable information device.

SUMMARY OF INVENTION

It is therefore a primary objective of the present invention to provide an image capturing apparatus with laser-framing viewfinder and laser pointer functions to solve the problems mentioned above.

Briefly summarized, an image capturing apparatus with laser-framing viewfinder and laser pointer functions includes a housing, a laser source installed inside the housing for generating a laser beam, a first lens group installed inside the housing for diverging the laser beam from the laser source, a reflecting object installed inside the housing in a rotatable manner for reflecting the laser beam from the first lens group, a second lens group installed inside the housing for diverging the laser beam from the reflecting object, a framing mask for masking the laser beam diverged by the second lens group and displaying a laser-framing viewfinder, a third lens group installed on the housing for focusing the laser beam from the first lens group, and a camera lens installed on the housing for capturing an image framed in the laser-framing viewfinder. When the reflecting object rotates to a first location, the reflecting object reflects the laser beam from the first lens group to the second lens group which can diverge the laser beam to the framing mask and the framing mask masks the laser beam for displaying a laser-framing viewfinder. When the reflecting object rotates to a second location, the third lens group focuses the laser bream via the first lens group from the laser source.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
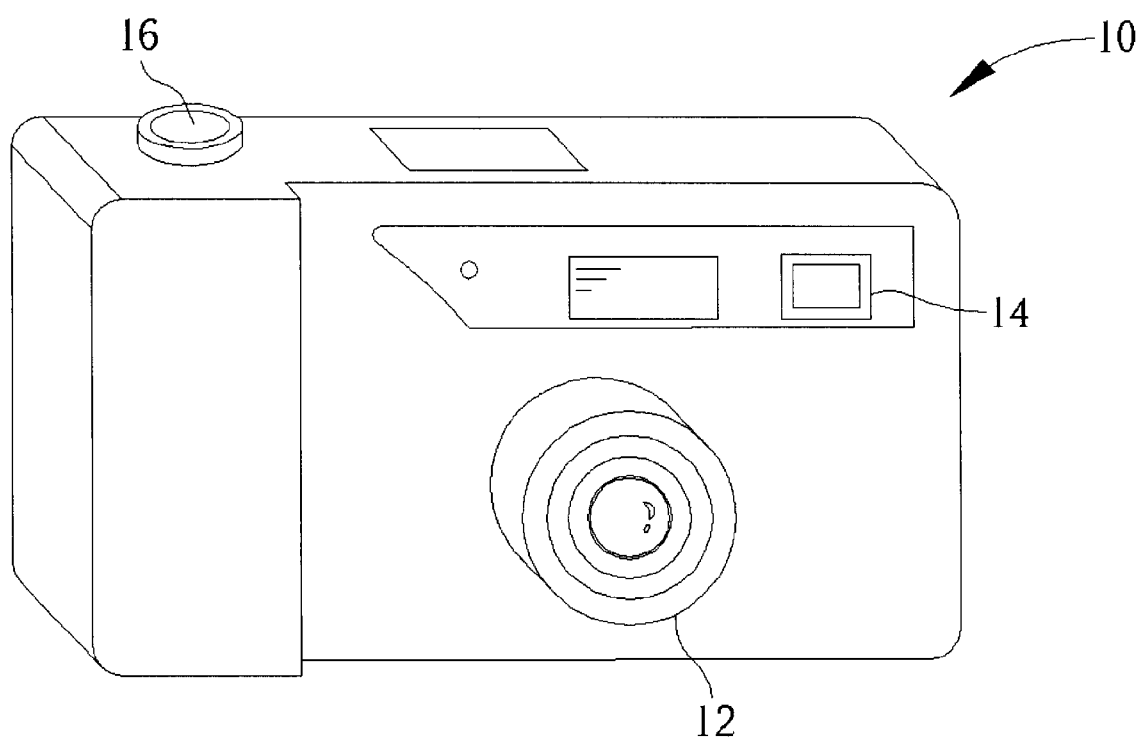
FIG. 1 is a front view diagram illustrating a conventional first digital camera.
Figure 2:
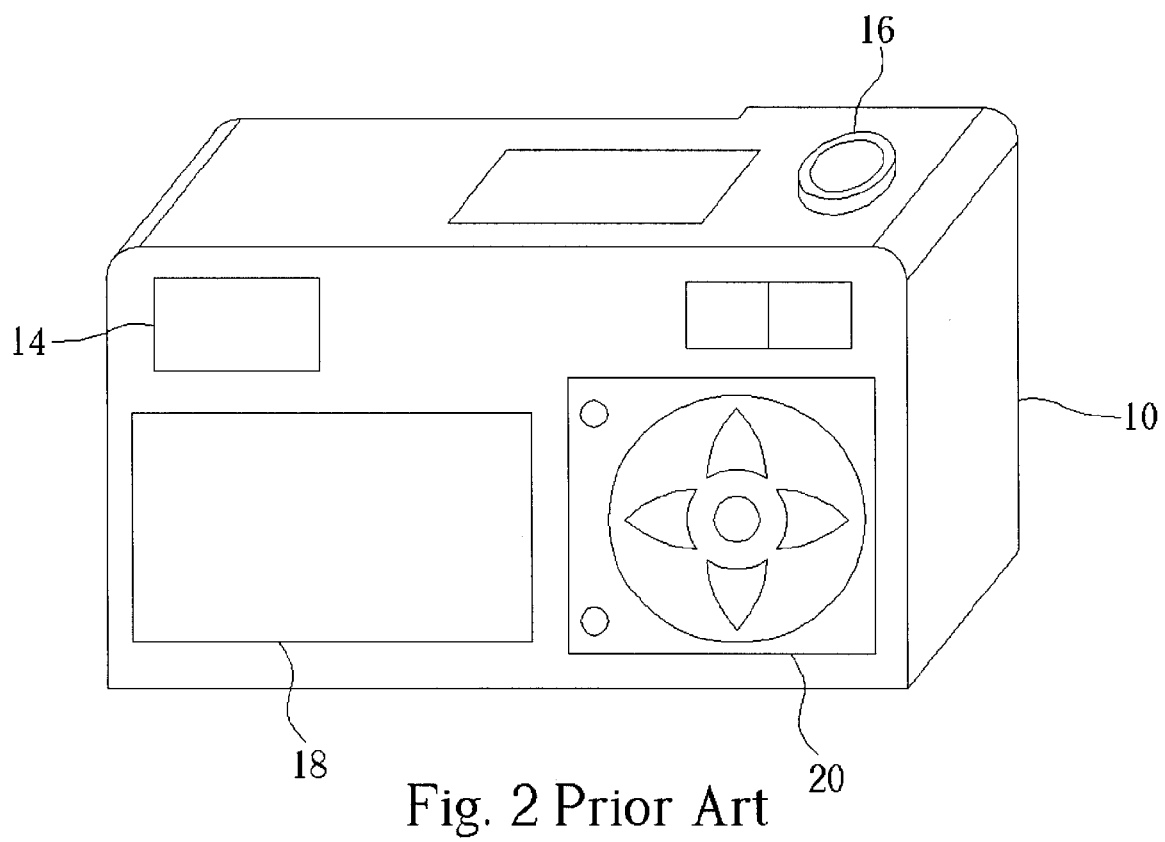
FIG. 2 is a rear view diagram of the first digital camera.
Figure 3:
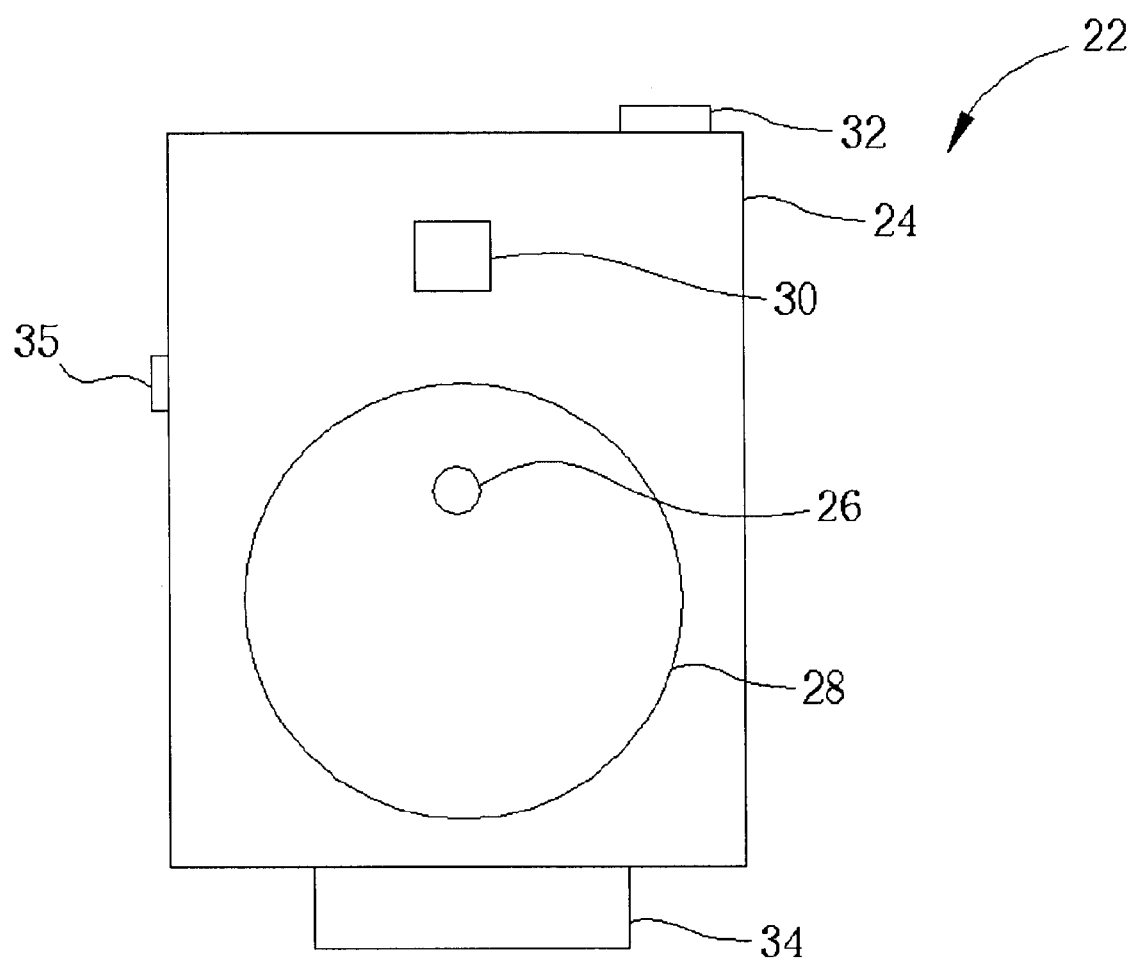
FIG. 3 is a front view diagram of a second digital camera according to the present invention.
Figure 4:
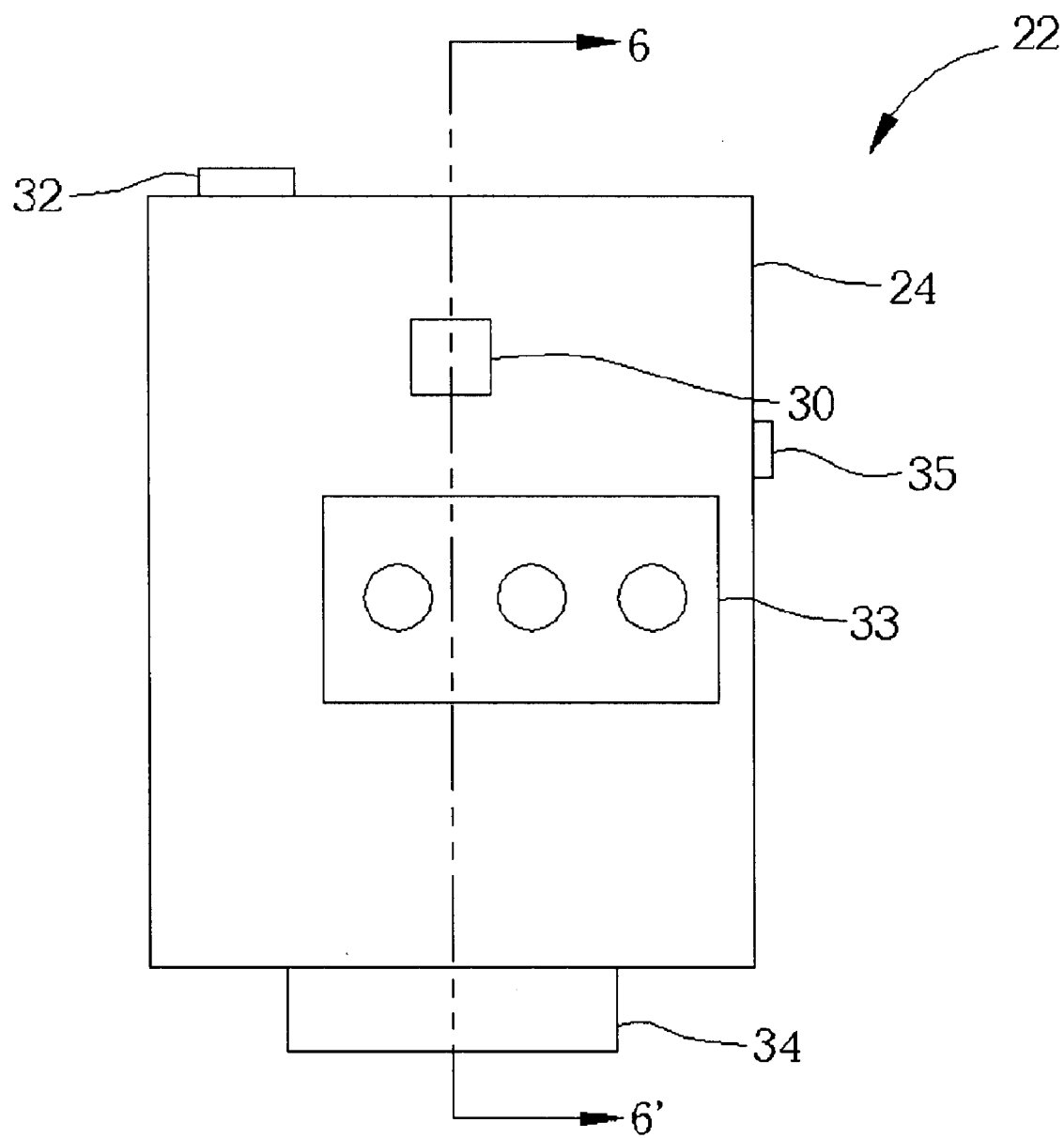
FIG. 4 is a rear view diagram of the second digital camera according to the present invention.
Figure 5:
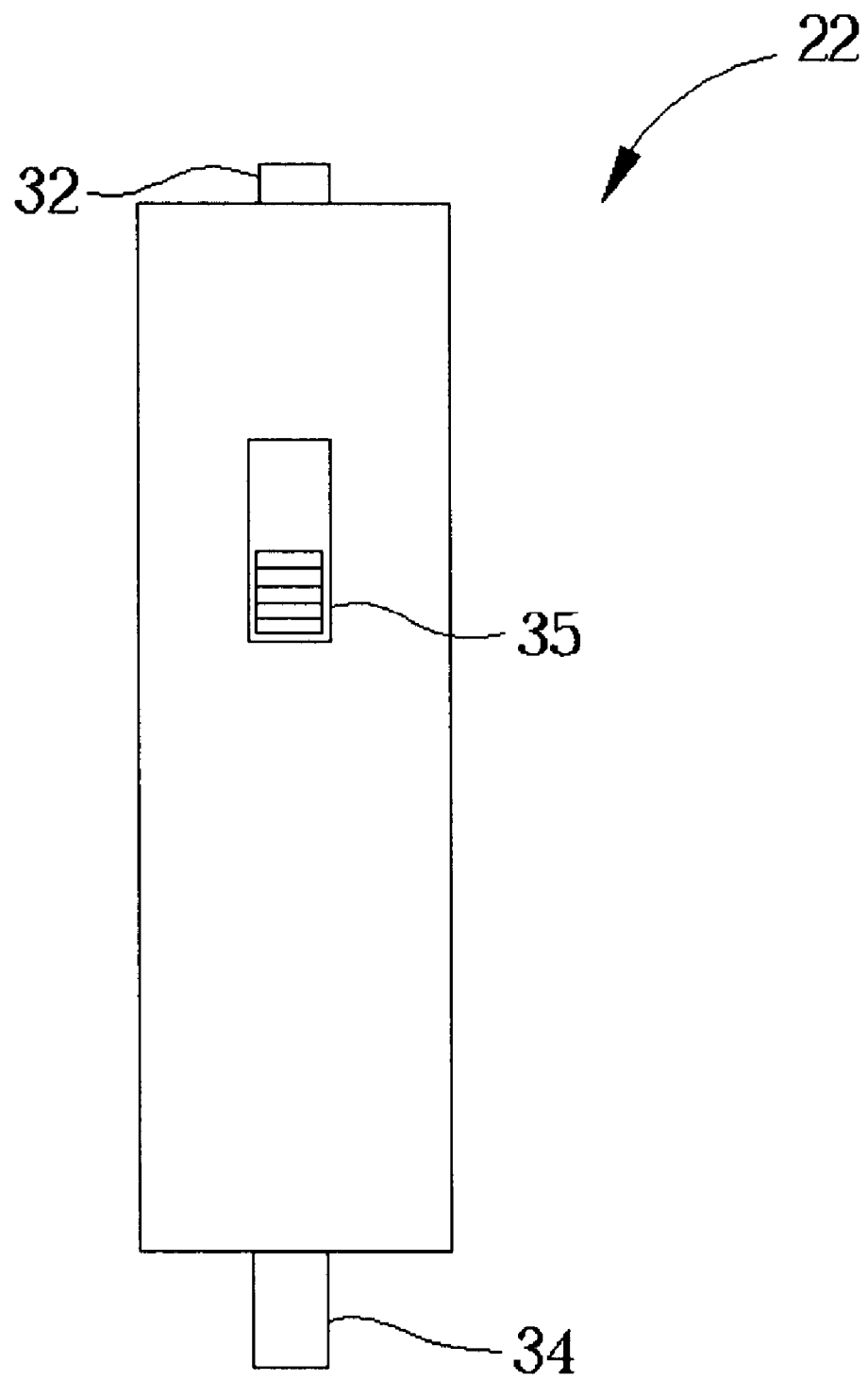
FIG. 5 is a lateral view diagram of the second digital camera according to the present invention.

Please refer to FIG. 3, FIG. 4, and FIG. 5. FIG. 3 is a front view diagram, FIG. 4 is a rear view diagram, and FIG. 5 is a lateral view diagram of a second digital camera 22 according to the present invention. The second digital camera 22 includes a housing 24, a camera lens 26 for capturing images, a rotating plate 28 installed on the housing 24 in a rotatable manner for protecting the camera lens 26 from dust and dirt, and an optical viewfinder 30, which comprises two optical viewfinder ports 31 installed respectively on the front side and the rear side of the housing 24 for users to view the image of an object. The second digital camera 22 further includes a shutter button 32 for focusing and shooting, a control button set 33 for controlling functions of the second digital camera 22, a connecting port 34 for outputting the photo image data, which conforms to the USB1.1, USB2.0, USB OTG or the IEEE1394 standard, and a reflecting object adjusting device 35.

Figure 6:
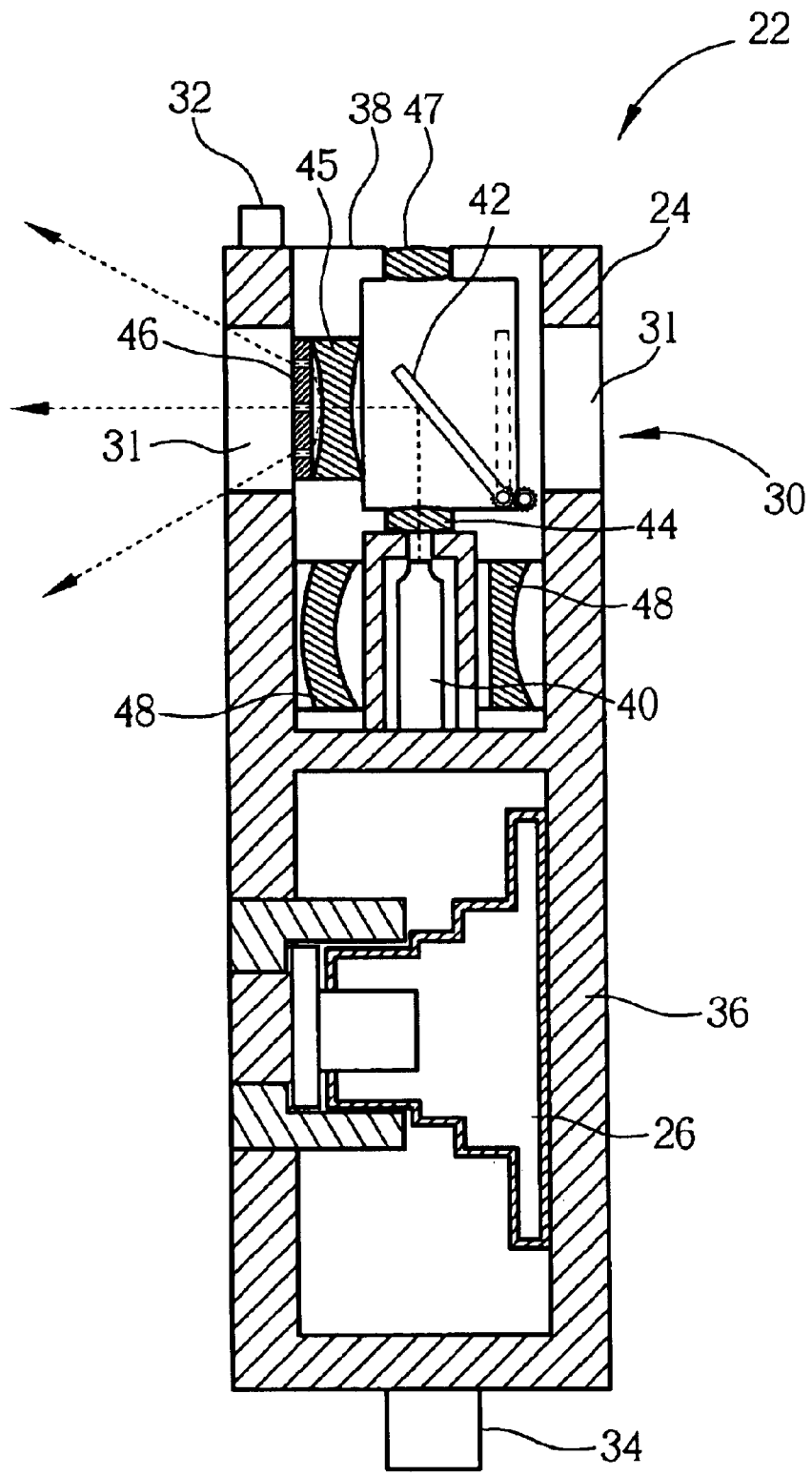
FIG. 6 is a cross section diagram of the second digital camera along line 6–6" in FIG. 4.

Please refer to FIG. 6. FIG. 6 is a cross section diagram of the second digital camera 22 along line 6–6" in FIG. 4. The housing 24 includes a main body 36 and a sliding set 38 installed on the main body 36. The second digital camera 22 further includes a laser source 40 installed inside the main body 36 for generating a laser beam, a first lens 44 installed inside the sliding set 38 for diverging the laser beam generated by the laser source 40, a reflector 42 such as a plane mirror that is adjustable and installed in the sliding set 38 for reflecting the laser beam diverged by the first lens 44, a second lens 45 installed inside the main body 36 for diverging the laser beam reflected by the reflector 42, and a third lens 47 installed inside the sliding set 38 for focusing the laser beam diverged by the first lens 44.

Figure 7:
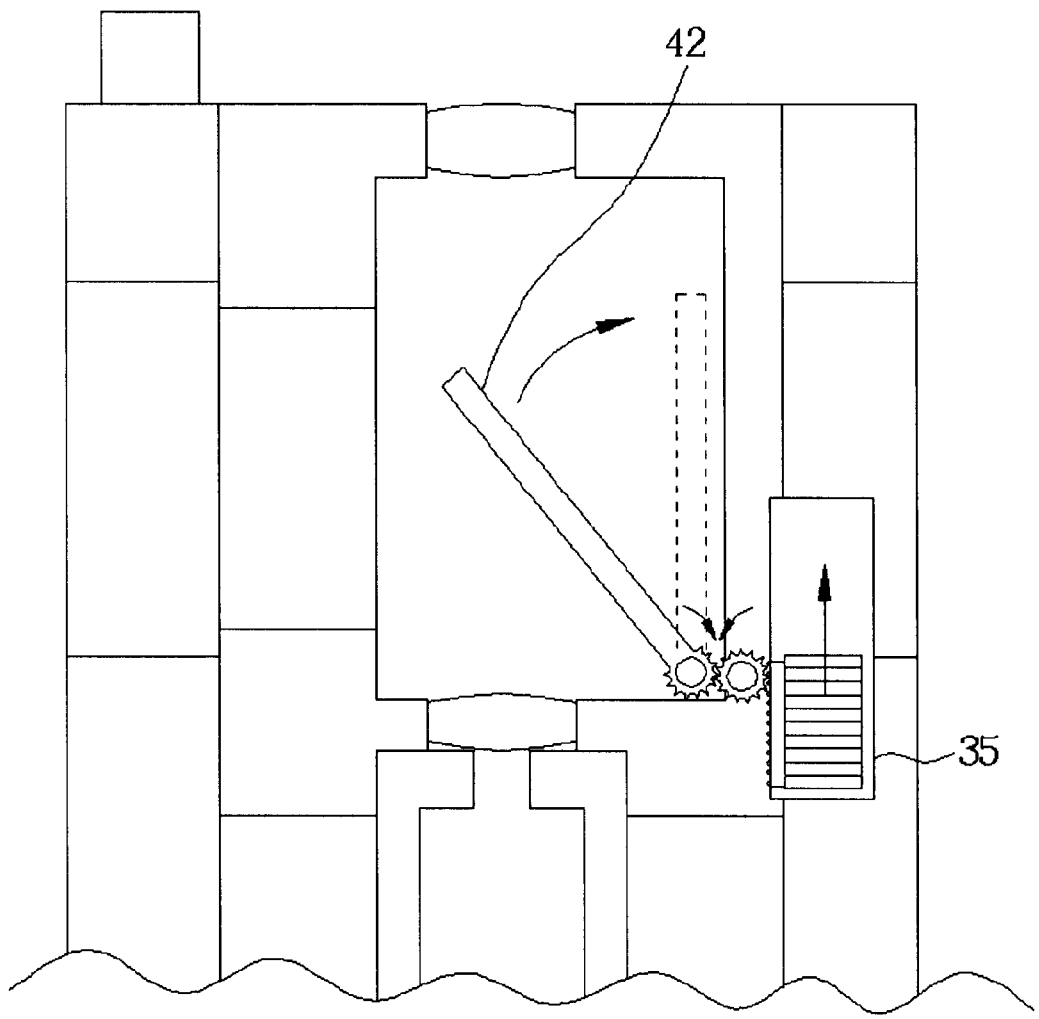
FIG. 7 is a diagram illustrating the action of a reflecting object adjusting device and a reflecting object.

Please refer to FIG. 7. FIG. 7 is a diagram illustrating the action of the reflecting object adjusting device 35 and the reflecting object 42. The reflecting object adjusting device 35 is a gear mechanism. When the reflecting object adjusting device 35 is adjusted to the lower side, the reflecting object 42 and main body 36 form an angle of 45 degrees. When the reflecting object adjusting device 35 is adjusted to the upper side, the reflecting object 42 rotates clockwise to a position parallel to the main body 36. It is a preferred embodiment that the reflecting object adjusting device 35 is capable of adjusting the angle between the reflecting object 42 and the main body 36. Additionally, the reflecting object adjusting device 42 can be another type of mechanism to adjust the angle between the reflecting object 42 and the main body 36.

Figure 8:
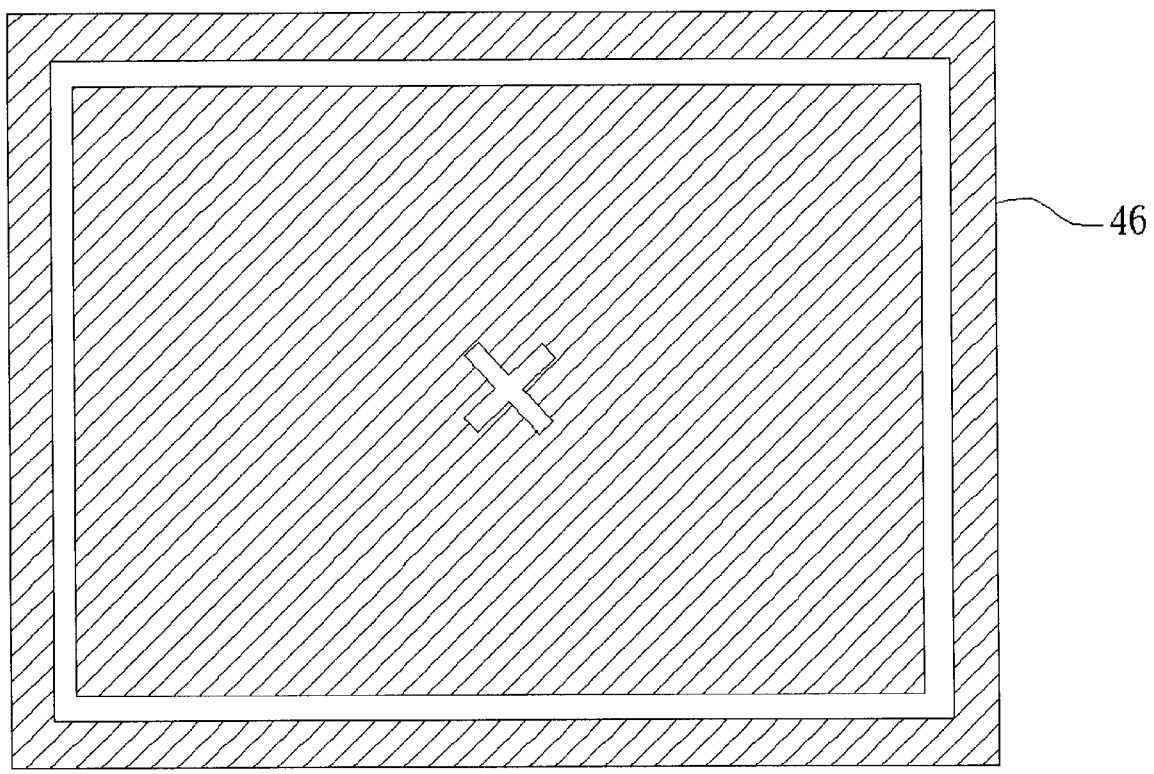
FIG. 8 is a diagram illustrating a framing mask.
Figure 9:
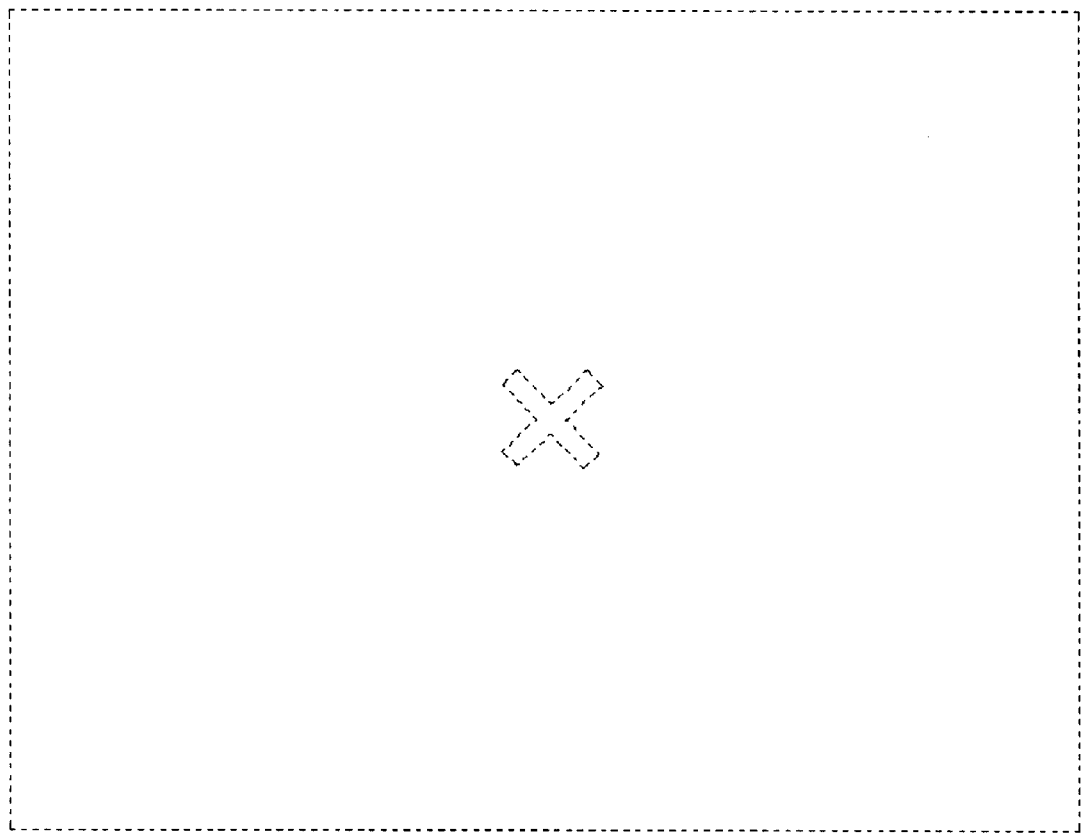
FIG. 9 is a diagram illustrating the laser-framing viewfinder.
Figure 10:
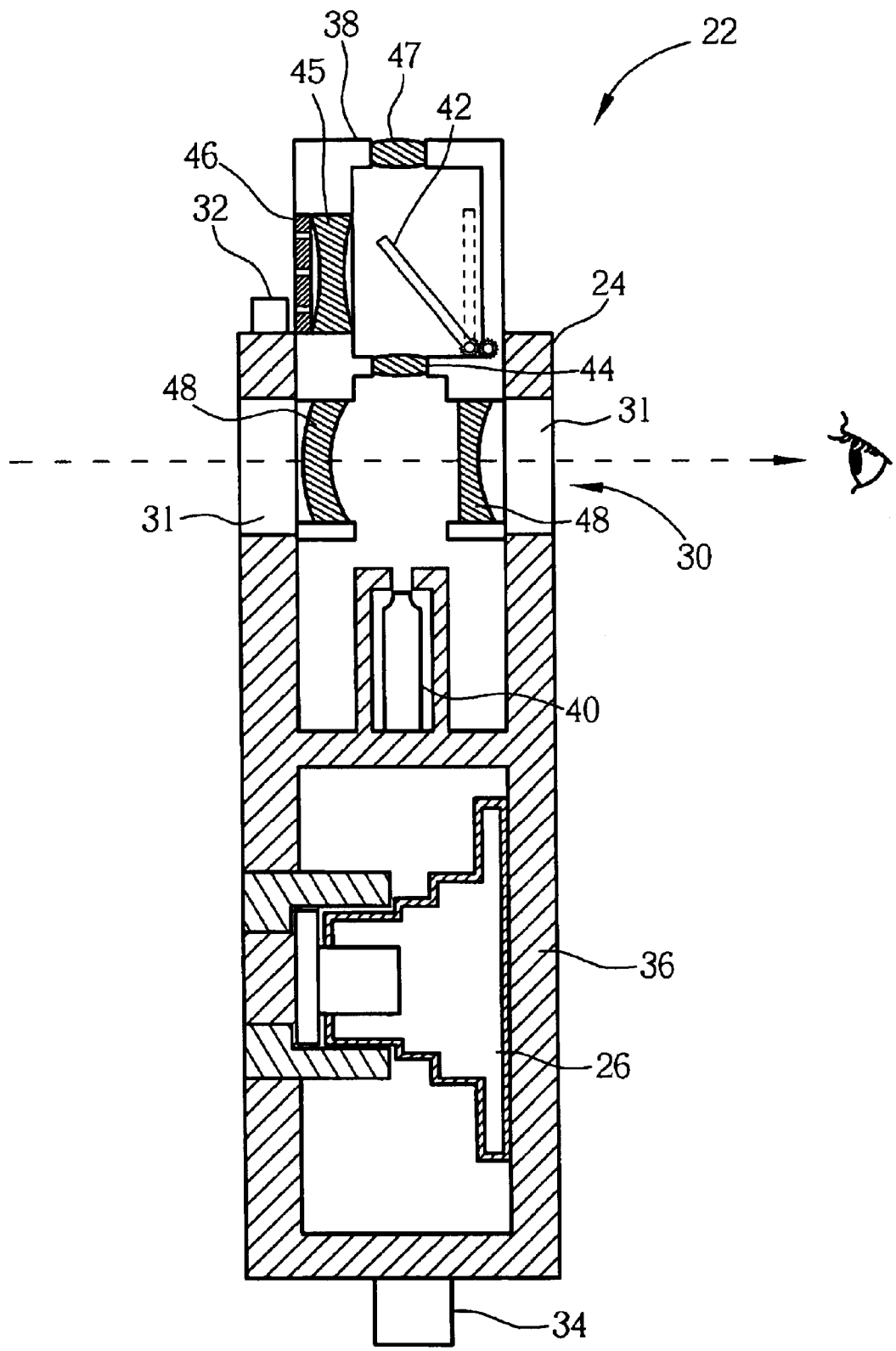
FIG. 10 is a diagram illustrating a sliding set in FIG. 5 sliding to the upper side.

The second digital camera 22 further includes a framing mask 46 installed inside the sliding set 38, which includes shading material for masking the laser beam diverged by the second lens 45 and reflected by the reflector 42 to form a laser-framing viewfinder. Please refer to FIG. 8. FIG. 8 is a diagram illustrating the framing mask 46. The lined area is the shading material and the laser beam can only pass through the clear area of the framing mask 46 to form a shape of a laser-framing viewfinder. Please refer to FIG. 9. FIG. 9 is a diagram illustrating the laser-framing viewfinder formed after the laser beam passes through the framing mask 46. Users can capture an image inside the box marked by the laser-framing viewfinder and the dotted cross in the center is for aiming the center. Designers can determine the shape of the laser-framing viewfinder by modifying the shape of the framing mask 46. The visual angle of the laser framing viewfinder can be configured to be the same to the visual angle of the camera lens 26 by adjusting the combination or the focus of the first lens 44, the second lens 45 and the framing mask 46, in order to have the image in the laser-framing viewfinder be the same to the real image. The second digital camera 22 further includes a fourth lens set 48 installed inside the sliding set 38, which can slide with the sliding set 38 to the position between the two optical viewfinder ports 31. The fourth lens set 48 includes a plano-concave lens and a convexo-concave lens, or another lens group. Please refer to FIG. 10. FIG. 10 is a diagram illustrating the sliding set 38 when slid to the upper side. When the sliding set 38 slides upwards in the housing 24, the fourth lens set 48 slides to a position between the two optical viewfinder ports 31. The user can view the object through the optical viewfinder 30, and the visual angle of the optical viewfinder 30 can be configured to be the same as the visual angle of the camera lens 26 by adjusting the focus and the combination of the fourth lens set 48, in order to have the image shown in the optical viewfinder 30 be the same to the real image captured by the camera lens 26.

Figure 11:
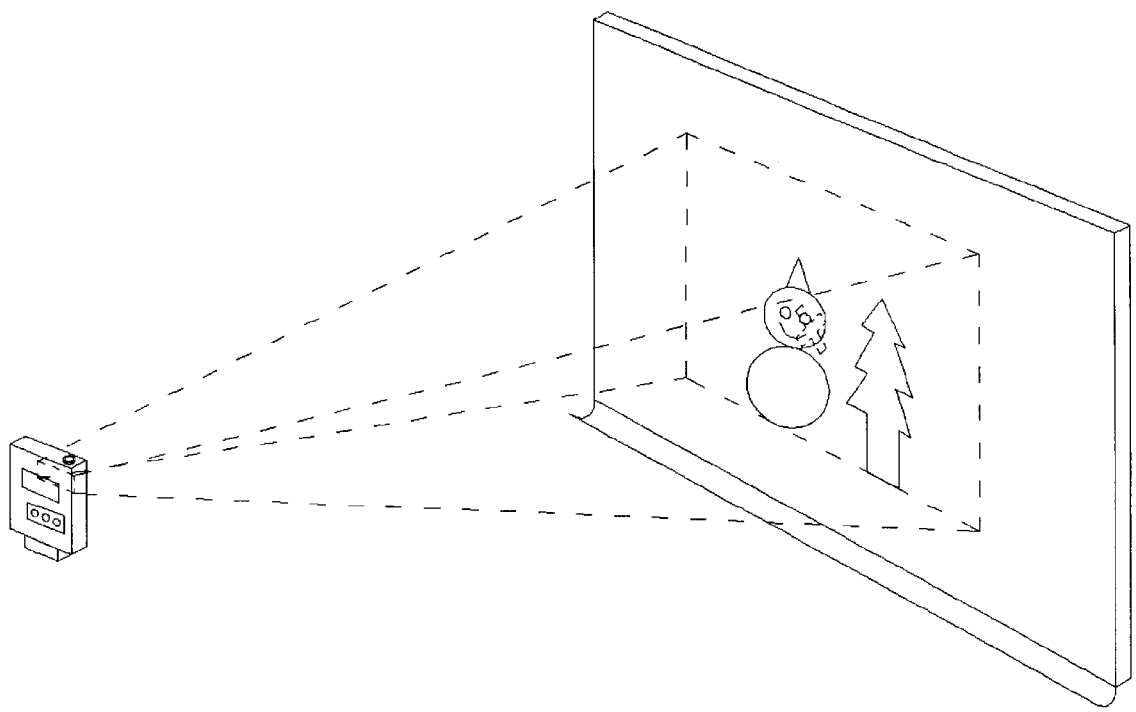
FIG. 11 is a diagram illustrating the second digital camera capturing an image through the laser-framing viewfinder.

The operation of the second digital camera 22 is as follows. When viewing an image, the user switches the reflecting object adjusting device 35 to the lower end to position the reflecting object 42 and main body 36 at an angle of 45 degrees, and switches on the laser source 40 using the control button set 33 so that the laser source 40 generates a laser beam. The laser beam passes through and is diverged by the first lens 44 and is then reflected toward the second lens 45 by the reflector 42. The angle between the reflector 42 and the laser source 40 can be adjusted according to a required angle of reflection. The laser beam is further diverged by the second lens 45 and directed toward the framing mask 46. The framing mask 46 partially blocks the laser beam to form a laser-framing viewfinder projected around the object. Please refer to FIG. 11. FIG. 11 is a diagram illustrating the second digital camera 22 capturing an image through the laser-framing viewfinder. The laser source 40 can be a low power laser generator and can generate laser beams at specific intervals of a time to conserve power used for the laser source 40 and protect the user's eyes from the laser. The laser source 40 of the present invention requires a proper arrangement of time, frequency, and intensity in order to optimize power savings and user safety. When shooting the image, the user presses the shutter button 32 to capture the image, and outputs the shot image data using the connecting port 34 to other peripherals, such as personal computers, notebooks, or printers for image editing or printing.

When an object is too far from the second digital camera 22 or no object exists for the laser beam to project a viewfinder box on, the laser-framing viewfinder cannot be used. In this situation, as shown in FIG. 10, it is allowable to slide the sliding set 38 upwards in the housing 24 to move the fourth lens set 48 to the position between the two optical viewfinder ports 31, in order to view the object through the optical viewfinder 30. When viewing the object through the optical viewfinder 30, the user can switch off the laser source 40 by the control button set 33 to prevent visual interference with the laser beam. The control button set 33 can be a movable switch, which means that the sliding set 38 presses the control button set 33 when positioned inside the housing 24 to switch on the laser source 40. And when the sliding set 38 slides upwards in the housing 24 as shown in FIG. 8, the control button set 33 is released to switch off the laser source 40. In such a manner the laser source 40 can be switched on and off automatically.

The shutter of the second digital camera 22 can be two-staged. The focus can be automatically determined when the user presses the shutter button 32. Automatic exposure and white balance can be switched off in order to prevent the intensity of light from being effected by the laser beam. When the shutter button 32 is pressed to the first stage, the second digital camera 22 finds the view and focuses automatically, and when the shutter button 32 is pressed to the second stage, the image is captured through the camera lens 26. Furthermore, the laser source 40 is switched off to prevent from interfering image shooting. If the shot is going to be aborted, the user can release the shutter button 32 at the first stage.

Figure 12:
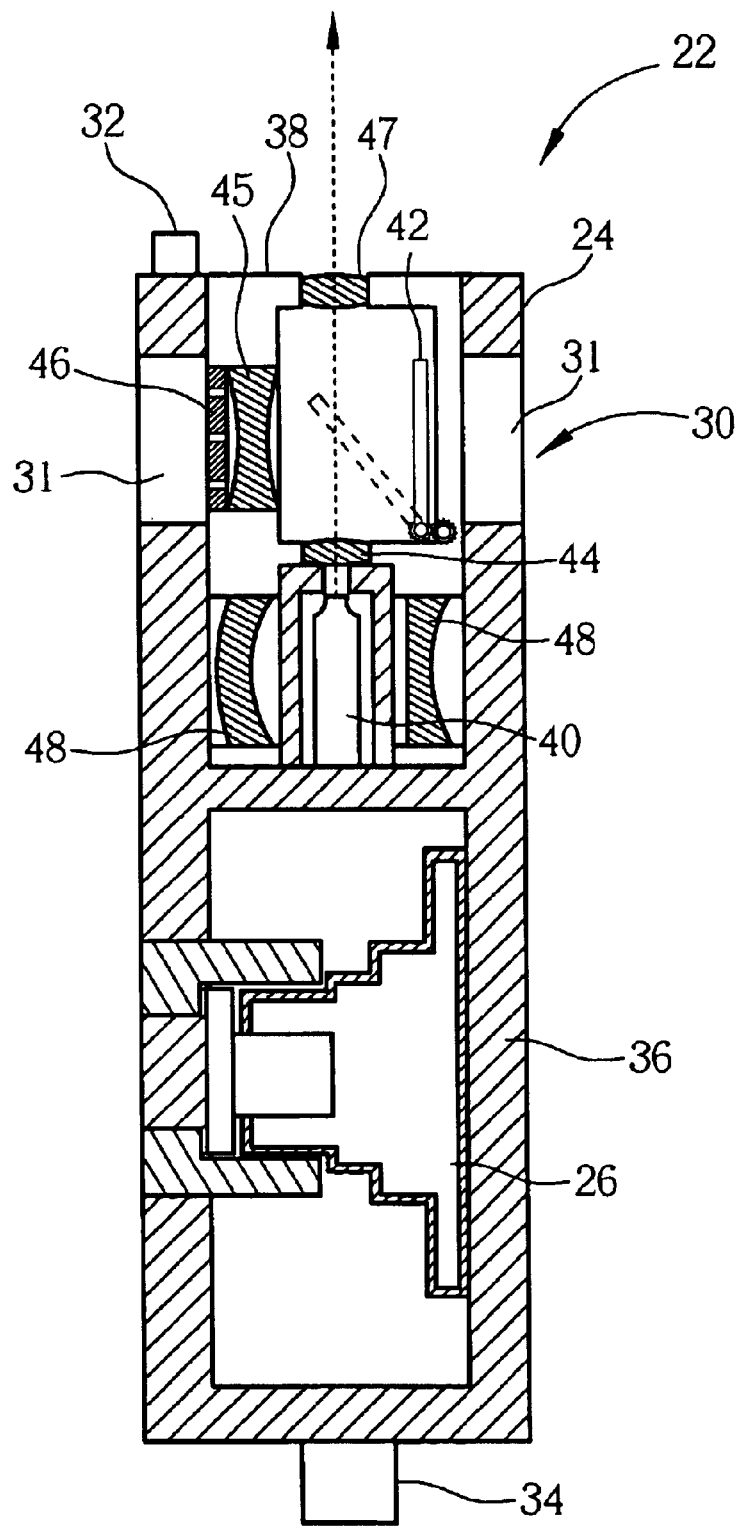
FIG. 12 is a diagram illustrating the reflecting object parallel to a main body.

Please refer to FIG. 12. FIG. 12 is a diagram illustrating the reflecting object 42 parallel to the main body 36. When the user wants to use the laser point function of the second digital camera 22 instead of capturing an image, for example, pointing to briefing content during a meeting, the reflecting object adjusting device 35 can be switched to the upper end to switch the reflecting object parallel to the main body 36. The user can then use the control button set 33 to switch on the laser source 40 to generate the laser beam. The laser beam passes through and is diverged by the first lens 44 directly toward to the third lens 47 instead of being reflected by the reflecting object 42. The third lens 47 focuses the laser beam to project it toward the object. The housing 24 above the third lens 47 can be the same conformation as the framing mask 46, and the camera designer can determine the shape of the laser-framing pattern by modifying the shape of the housing 24 above the third lens 47 too.

In contrast to the prior art, the present invention provides a laser-framing viewfinder of small size and low cost for image capturing apparatuses to replace conventional electrical viewfinders with high power consumption, high cost, and large size. In addition to these advantages, the laser-framing viewfinder can be used in the nighttime or in other low-light conditions where it would not be possible for conventional optical or electrical viewfinders to operate. Additionally, when the laser-framing viewfinder cannot be projected due to the object being too far from the second camera 22 or no object exists, users can slide the fourth lens set 48 to the position between the two optical viewfinder ports 31 in order to view the object through the optical viewfinder 30. Thus, the present invention includes optical and laser-framing viewfinders. Moreover, by adjusting the angle of the reflecting object 42 of the second digital camera 22, the laser-framing viewfinder function or the laser pointer function can be selected. Thus, the present invention further provides a laser pointer function unavailable in conventional image capturing apparatuses.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An image capturing apparatus with laser-framing viewfinder and laser pointer functions, the image capturing apparatus comprising:
   a housing;
   a laser source installed inside the housing for generating a laser beam;
   a first lens set installed inside the housing for diverging the laser beam;
   a reflector installed inside the housing in a rotatable manner for reflecting the laser beam from the first lens set;
   a second lens set installed inside the housing for diverging the laser beam reflected by the reflector;
   a framing mask for masking the laser beam diverged by the second lens set to form a laser-framing viewfinder;
   a third lens set installed on the housing for focusing the laser beam from the first lens set; and
   a camera lens installed on the housing for capturing an object in the laser-framing viewfinder;
   wherein when the reflector rotates to a first position, the reflector is capable of reflecting the laser beam from the first lens set, the second lens set is capable of diverging the laser beam reflected by the reflector, and the framing mask is capable of masking the laser beam diverged by the second lens set to form the laser-framing viewfinder, and when the reflector rotates to a second position, the third lens set is capable of focusing the laser beam from the first lens set.

2. The image capturing apparatus of claim 1, wherein the reflector is a plane mirror.

3. The image capturing apparatus of claim 1, wherein the housing comprises a main body and a sliding set installed on the main body, and the laser source is installed inside the main body, and the first lens set and the second lens set are installed inside the sliding set.

4. The image capturing apparatus of claim 3, further comprising an optical viewfinder comprising two optical viewfinder ports installed on the main body for receiving light to view the object being image captured.

5. The image capturing apparatus of claim 4, further comprising a fourth lens set installed on the sliding set, wherein the fourth lens set slides to a position between the two optical viewfinder ports with the sliding set.

6. The image capturing apparatus of claim 5, wherein the fourth lens set comprises a plano-concave lens and a convexo-concave lens.

7. The image capturing apparatus of claim 1, wherein the framing mask comprises shading material.

8. The image capturing apparatus of claim 1, further comprising a connecting port for outputting image data.

9. The image capturing apparatus of claim 8, wherein the connecting port conforms to the USB or the IEEE1394 standards.

* * * * *